United States Patent
Henzler et al.

(10) Patent No.: US 8,302,484 B2
(45) Date of Patent: Nov. 6, 2012

(54) PRESSURE SENSOR SYSTEM

(75) Inventors: Stephan Henzler, Gomaringen (DE);
Peter Kunert, Lichtenstein (DE);
Matthias Ludwig, Moessingen (DE)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 12/837,265

(22) Filed: Jul. 15, 2010

(65) Prior Publication Data

US 2011/0016982 A1 Jan. 27, 2011

(30) Foreign Application Priority Data

Jul. 27, 2009 (DE) .......................... 10 2009 028 033

(51) Int. Cl.
*G01L 7/00* (2006.01)
(52) U.S. Cl. ........................................ 73/756
(58) Field of Classification Search .................. 73/756, 73/708

See application file for complete search history.

(56) References Cited

U.S. PATENT DOCUMENTS 6,267,010 B1 * 7/2001 Hatanaka et al. ............... 73/756
7,441,461 B2 * 10/2008 Muth et al. ..................... 73/756

\* cited by examiner

*Primary Examiner* — Jewel V Thompson
(74) *Attorney, Agent, or Firm* — Kenyon & Kenyon LLP

(57) ABSTRACT

A pressure connection concept for pressure sensor modules is provided, using which the influence of assembly-related stresses in the sensor system on the sensor diaphragm and accordingly on the measuring signal detection is kept very low. The sensor system includes a sensor module for pressure detection and a connecting piece and at least one seal for coupling the sensor module to a measuring system. The sensor module includes at least one sensor element having a diaphragm and means for signal detection. Together with the means for signal detection, the sensor element is provided with packaging having a pressure connection opening and electrical contacts. A pressure channel is provided in the connecting piece, the pressure channel being coupled to the pressure connection opening of the sensor module using the seal. The packaging of the sensor module includes a tube-shaped projection which forms the pressure connection opening, and the pressure channel of the connecting piece terminates in a connecting tube. The tube-shaped projection of the sensor module and the connecting tube of the connecting piece fit into each other, and the seal designed as a radial seal is situated between the walls of the tube-shaped projection and the connecting tube.

3 Claims, 1 Drawing Sheet

PRESSURE SENSOR SYSTEM

FIELD OF THE INVENTION

The present invention relates to a sensor system having a sensor module for detecting pressure and having a connecting piece and at least one seal for coupling the sensor module to a measuring system. The sensor module includes at least one sensor element having a diaphragm and means for signal detection. Together with the means for signal detection, the sensor element is provided with packaging having a pressure connection opening and electrical contacts. A pressure channel is provided in the connecting piece, the pressure channel being coupled to the pressure connection opening of the sensor module using the seal.

BACKGROUND INFORMATION

Sensor systems are used, for example, in connection with safety systems in the motor vehicle sector. The sensor elements are implemented together with evaluation circuit components in the form of sensor chips that are produced in large numbers and provided with packaging. On the one hand, the packaging protects the sensor function and the circuit components, and on the other hand, it simplifies the installation of the sensor element at the particular point of use. A plastic molded housing having a metal plate situated over the sensor diaphragm and having a pressure connection opening is frequently used as packaging. This type of packaging may be manufactured simply and cost-effectively. It is also extremely stable and media-resistant.

As the measuring medium is soiled with dirt and particles in many applications, the pressure connection to the measuring system is usually designed in such a way that only the sensor diaphragm is exposed to the measuring medium while the other components of the sensor module, such as the electrical contacts, are not intended to come into contact with the measuring medium. To that end, the pressure channel of the connecting piece is situated in alignment with the pressure connection opening above the sensor module. The connection between the pressure channel and the pressure connection opening is sealed to protect the other components of the sensor module from the measuring medium.

This situation is illustrated in FIG. 1. Sensor module 10 shown here includes a sensor chip having a sensor diaphragm 1 for pressure detection. A metal plate 2 having a pressure connection opening 3 is situated above sensor diaphragm 1. Metal plate 2 is integrated in the top of molded housing 4 of the sensor chip. Electrical contacts 5 for the sensor chip are provided on the bottom of molded housing 4. Accordingly, sensor module 10 is mounted on a circuit board 11 in this case. The pressure connection of sensor module 10 to a measuring system is made via connecting piece 12 in the shape of a lid in which pressure channel 13 is provided. Connecting piece 12 is mounted above sensor module 10 in such a way that pressure connection opening 3 of sensor module 10 and pressure channel 13 of connecting piece 12 are situated in alignment with one another. This flange-type connection between pressure connection opening 3 and pressure channel 13 is sealed in this case using an annular seal 14 compressed in a planar manner between connecting piece 12 and the upper side of the housing of sensor module 10.

This annular seal must be kept permanently under compressive stress in order to ensure the sealing effect, which proves to be problematic. In practice, it has namely been shown that the compressive stress acting perpendicular to the sensor diaphragm may be transmitted to the sensor element via the packaging of the sensor module. This results in a corruption of the measuring signals. In addition, the electrical connection of the sensor module may also be damaged in this manner.

SUMMARY OF THE INVENTION

The present invention provides a pressure connection concept for pressure sensor modules which keeps the influence of assembly-related stresses in the sensor system on the sensor diaphragm and accordingly on the measuring signal detection at a very low level.

According to the present invention, the packaging of the sensor module includes a tube-shaped projection which forms the pressure connection opening. In addition, the pressure channel of the connecting piece terminates in a connecting tube. The tube-shaped projection of the sensor module and the connecting tube of the connecting piece are placed one inside the other and sealed using the seal designed as an annular seal which is situated between the walls of the tube-shaped projection and the connecting tube.

In the sensor system of the present invention, the sealing effect is thus based on a radial force acting parallel to the plane of the diaphragm on two tube walls of the pressure feed placed one inside the other. This radial force causes—if at all—significantly lower stresses in the sensor diaphragm than the planar compression described above in connection with the related art which acts perpendicular to the sensor diaphragm. The bipartite implementation of the pressure feed in the form of a tube-shaped projection on the sensor module and a connecting tube on the connecting piece according to the present invention also simplifies the assembly of the sensor system, as the sensor module and the connecting piece are automatically aligned with one another when the two tube ends are put together. The radial seal between the tube walls also makes it possible for production tolerances in the area of the pressure connection to be compensated very simply.

Basically, there are various possibilities for implementing the sensor system according to the present invention. Therefore, the present invention includes variations in which the tube-shaped projection of the sensor module is inserted into the connecting tube of the connecting piece and also variations in which the cross section of the tube-shaped projection is larger than the cross section of the connecting tube so that the connecting tube is inserted into the tube-shaped projection. In both cases, the seal is situated between the tube walls and is under radial compressive stress.

In one particularly advantageous specific embodiment of the present invention, at least one of the two tube ends, either the tube-shaped projection of the sensor module or the connecting tube of the connecting piece, or even both of them, have a conical reduction. In this case, the radial seal is situated in the area of this conical reduction. As a function of the taper of the walls of the two tube ends placed one inside the other, it is possible to simply implement a particularly reliable pinch seal having a conical seat.

The packaging of the sensor module of the sensor system according to the present invention may also be implemented in a variety of ways. Molded housings, of plastic may be manufactured in a particularly simple and cost-effective manner. Such housings are stable, which proves to be advantageous in particular for the assembly of the sensor module. In addition, plastic housings are extremely media-resistant. The tube-shaped projection which, according to the present invention, is used as a pressure connection opening, may be molded together with the rest of the plastic housing. However, it may also be produced as a separate component, preferably from metal for reasons of stability, and then integrated in the molding compound of the housing together with the sensor element.

DETAILED DESCRIPTION

Figure 1:
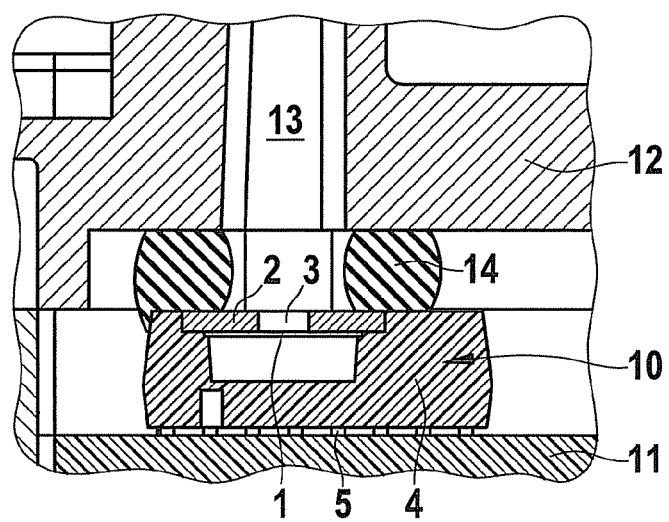
FIG. 1 shows a schematic cross section through a sensor system for pressure detection according to the related art explained above.
Figure 2:
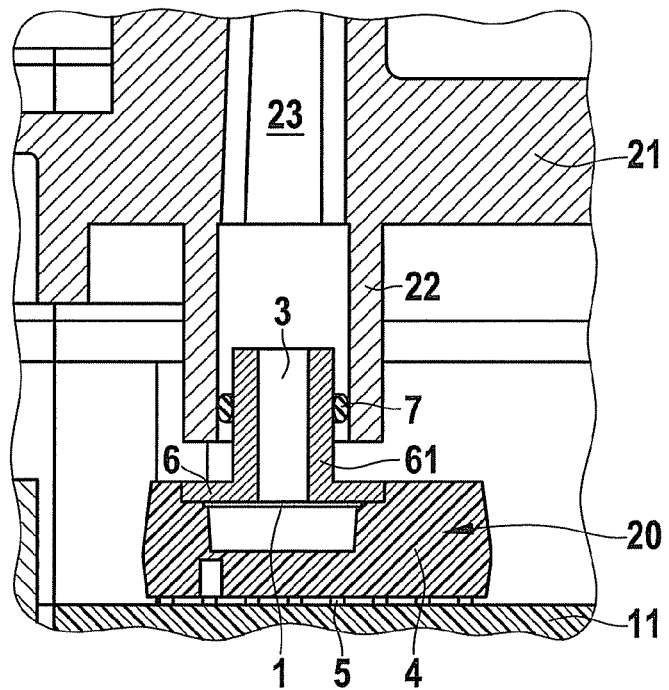
FIG. 2 shows a schematic cross section of a first sensor system for pressure detection according to the present invention.

A sensor system according to the present invention is shown in FIG. 2. This sensor system includes a sensor module 20 for pressure detection which is coupled to a measuring system (not shown in greater detail here) using a connecting piece 21 and a seal 7. The core of sensor module 20 is a sensor chip having a sensor diaphragm 1 and circuit elements for signal detection. The sensor chip is integrated in a plastic molded housing 4, electrical contacts 5 for the sensor chip being provided on the underside of the molded housing. In the exemplary embodiment shown here, sensor module 20 is mounted on a circuit board 11.

The packaging of the sensor chip includes a flange-type metal component 6 having a tube-shaped projection 61. This metal component 6 is situated above sensor diaphragm 1 and is integrated in the top of molded housing 4, so that tube-shaped projection 61 forms pressure connection opening 3 of sensor module 20.

As already mentioned, the pressure connection of sensor module 20 is implemented using connecting piece 21 in which a pressure channel 23 is provided. The pressure channel terminates in a connecting tube 22. According to the present invention, connecting tube 22 and tube-shaped projection 61 of sensor module 20 are placed one inside the other. A radial seal 7 which is situated in the overlap area between the tube walls and is compressed in the radial direction is used for sealing this plug connection. Radial seal 7 may, for example, simply be an O-ring.

Figure 3:
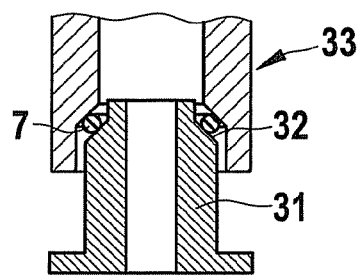
FIG. 3 shows a schematic cross section of the plug connection between the sensor module and the connecting piece of a second sensor system for pressure detection according to the present invention.

Only the plug connection between the sensor module and the connecting piece of another sensor system according to the present invention is shown in FIG. 3. In this exemplary embodiment, a conical reduction 32 is provided in the end area of the tube wall of tube-shaped projection 31 of the sensor module. The end area of connecting tube 33 is designed accordingly. Radial seal 7 is situated here in the area of these conical surfaces to intensify the contact force of seal 7 without significantly increasing the stress on the sensor chip.

What is claimed is:

1. A sensor system comprising:
   a sensor module for pressure detection, the sensor module including at least one sensor element having a diaphragm and an arrangement for signal detection, the sensor element, together with the arrangement for signal detection, being provided with packaging having a pressure connection opening and electrical contacts, the packaging of the sensor module including a tube-shaped projection which forms the pressure connection opening; and
   a connecting piece and at least one seal for coupling the sensor module to a measuring system, a pressure channel being provided in the connecting piece, the pressure channel being coupled to the pressure connection opening of the sensor module using the seal, the pressure channel of the connecting piece terminating in a connecting tube, the tube-shaped projection of the sensor module and the connecting tube of the connecting piece being situated one inside the other, the seal being a radial seal and being situated between walls of the tube-shaped projection and the connecting tube.

2. The sensor system according to claim 1, wherein at least one of the tube-shaped projection of the sensor module and the connecting tube of the connecting piece has a conical reduction, and the radial seal is situated in an area of the conical reduction.

3. The sensor system according to claim 1, wherein the packaging of the sensor module is in the form of a molded housing, into which the tube-shaped projection is integrated.

* * * * *